United States Patent Office 2,766,132
Patented Oct. 9, 1956

2,766,132

CARBONATE ROCK AGGREGATE BONDED WITH BITUMEN CONTAINING A POLYALKYLENE POLYAMINO IMIDAZOLINE

Charles M. Blair, Jr., Webster Groves, and Kenneth J. Lissant, Kirkwood, Mo., assignors to Petrolite Corporation, a corporation of Delaware No Drawing. Application December 21, 1950, Serial No. 202,138

8 Claims. (Cl. 106—273)

In its broadest aspect the present invention is concerned with a new bituminous composition having improved anti-stripping properties. These improvements are accomplished by incorporating in the bituminous mixture certain relatively high molecular weight, basic, nitrogen-containing compounds, which may be described, as a class, as polyaminoimidazolines of the general formula:

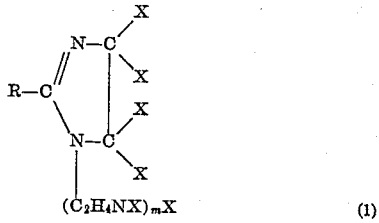

$(C_2H_4NX)_mX$   (1)

where R is a hydrocarbon radical containing from 8 to 32 carbon atoms; X is hydrogen or a small alkyl radical such as methyl, ethyl or propyl, and m is the number 3 to 10. These compounds and groups will be more completely described below, along with a description of the preferred types of compounds of this class, for use in improving the anti-stripping properties of bitumen and aggregate compositions. In a further aspect the invention not only includes the use of the imidazolines as such, but also their salts, as hereinafter described.

A specific phase of the present invention is the use of the imidazolines, and more particularly, certain salts of the imidazolines, in connection with aggregates which have a carbonate structure, such as limestone, dolomite, etc., as differentiated from aggregates which are largely siliceous, such as quartz, sand, rhyolite, granite and the like.

In many industrial applications of bitumen, asphalt, tar and similar asphaltic or bituminous produces, these materials are mixed with or applied to inorganic materials to form a concrete-like composition which is utilized for the preparaton of roads, dams, runways and other structures, or surface coatings where mechanical strength and impermeability to water or moisture are important functions. The most familiar application involving asphalt or bituminous materials mixed with inorganic products, is in the preparation of asphalt roadways. In this case, the inorganic material is referred to as aggregate, and the bituminous material is used for cementing the aggregate and retaining it in a smooth continuous form. Other applications include those in which asphalt is employed in compacting of earth to retain or direct the flow of water, in the preparation of airport strips and in the compacting of soil to prevent erosion. The inorganic material associated with such asphalt or bituminous products is usually either siliceous rock such as river gravel, crushed granite, rhyolite or the like, or crushed limestone, dolomite, or, in some cases, ordinary earth. Another familiar application of asphalt to inorganic material is in the coating of pipes or metal structures with bitumen or asphalt to protect the metal from corrosion.

It has been found in practice that when asphalt is mixed with or applied to such inorganic materials, the concretes and coatings so formed are, in many cases, badly attacked by water, so that the asphaltic binding agent is actually separated from the rock or metal by moisture, with consequent decrease in strength, and, in some cases, actual washing off of the asphalt. This apparently arises from the fact that some asphalts or bitumens do not wet many of the aggregate materials used sufficiently well to prevent stripping by moisture.

We have found that by addition of certain organic reagents to the asphalt or bituminous material in relatively small amounts, the ability of the asphalt to wet inorganic aggregates is greatly increased, and that asphaltic cements prepared from asphalts containing such organic materials are highly resistant to leaching or stripping of the asphalt when the cement is in contact with moisture. Materials having this property are sometimes referred to as "asphalt wetting agents," and a particular class of compounds herein described may be said to have asphalt wetting properties to a high degree. These wetting agents may also be applied first to the inorganic material to enable it to be readily wet by the asphalt.

The entire rationale underlying the effectiveness of additives of the kind herein described is not entirely understood, for the following reason: To the extent that the hot fluid or liquid asphaltic material wets the inorganic aggregate or equivalent more readily, in the same sense that an aqueous solution of a surface-active agent wets an oily surface more readily, one may consider the function of such "additive" as being a wetting agent in the sense that it increases the wettability or tendency of the non-aqueous vehicle to wet or coat an inorganic substance.

However, some bitumens, asphalts, etc., seem to have natural wetting properties, but yet are susceptible to being stripped off readily, due to the action of moisture, as described in greater detail subsequently. It thus becomes apparent that perhaps the most significant property of these additives is their ability to prevent stripping in the solid state, or substantially solid state, which results from cooling, the resolution of an asphalt or bitumen emulsion, or evaporation of solvent from an asphalt solution. Stated another way, there are instances wherein the presently described additives might not confer any wetting property whatsoever, and yet be of enormous importance, due to the anti-stripping property.

In light of what has been said previously, it is customary in the trade to refer to these particular additives as "anti-strippers" or "anti-stripping agents" even though they could be designated as wetting agents or binding agents in the peculiar sense previously noted.

According to the present invention, this improvement in adherence and bonding of asphaltic, bituminous, tarry and hydrocarbon products to aggregate rocks and metals, is accomplished by adding to the bituminous material or to the aggregate, a relatively small amount of a high molecular weight polyaminoimidazoline having at least 3 amino groups in the 1-nitrogen atom substituent. These compounds are basic, heterocyclic ring compounds.

The preparation of an imidazoline substituted in the 2-position by aliphatic hydrocarbon radicals, is well described in the literature and is readily carried out by reaction between a mono-carboxylic acid and a diamine, or polyamine, containing at least one primary amino group, and at least one secondary amino group, or another primary amino group separated the first primary amino group by two carbon atoms.

When an aliphatic or cycloaliphatic carboxylic acid containing 9 or more carbon atoms is employed in the above described synthesis, the resulting imidazoline will contain a 2-substituent consisting of an aliphatic hydrocarbon radical containing 8 or more carbon atoms.

For the preparation of reagents suitable for the present invention, one may react a polyethylene amine containing 5 or more amino groups, at least one of which is a primary amino group separated by 2 carbon atoms from another primary or a secondary amino group. For example, if one reacts one mole of tetraethylene pentamine with one mole of stearic acid, at a temperature of 250-290° C., a substantial yield of polyaminoimidazoline is formed as illustrated by the following equation:

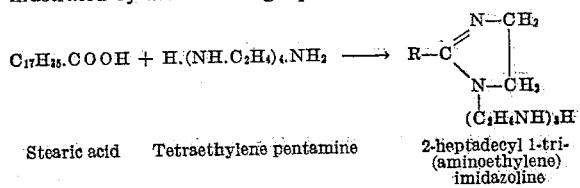

Stearic acid    Tetraethylene pentamine    2-heptadecyl 1-tri-(aminoethylene) imidazoline Polyamines which are suitable for the synthesis of the polyaminoimidazolines of the present invention, include tetraethylene pentamine; pentaethylene hexamine, tetraisopropylene pentamine; higher boiling polyethylene polyamines obtained in the manufacture of tetraethylene pentamine; N-ethyl, tetraethylene pentamine; 1-(triethylenetriamino), 2-diaminopropane and the like. Similar suitable polyamines may be obtained by condensation of di- or polyamines with ethylene dihalides; 1,2 propylene dihalides; and other 1,2 alkyl dihalides. For example, a suitable high boiling polyamine was prepared by heating together two moles of diethylene triamine with one mole of ethylene dibromide. Heating was carried out at 100° C. and held at this temperature by cooling after reaction started. It was then maintained at this temperature for 4 hours after the reaction subsided. The resulting polyamine hydrobromide was utilized directly in the imidazoline synthesis with abietic acid, yielding a polyamino imidazoline hydrobromide.

Similar suitable polyamines may be obtained by condensation of 1,2 diaminoalkanes with 1,2 dihaloalkanes. The resulting polyamino salts may be used as such, or may be converted to the free polyamines by neutralization with, for example, concentrated NaOH, heating to remove water, and filtering to remove salt. In such synthesis, of course, a variety of alkylation reactions take place with the production of a mixture of polyamines which may subsequently be distilled or otherwise fractionated to obtain a high molecular weight fraction having 5 or more amino groups per molecule and with the required primary and secondary amino groups. The imidazoline formation reaction can, itself, be used to assay such crude polyamine mixtures for content of suitable species of amines capable of yielding imidazolines by reaction with carboxylic acids.

Acids suitable for this type of synthesis include the aliphatic acids such as oleic, linoleic, linolenic, stearic, and erucic, as well as other carboxylic acids such as tall oil acids, abietic acid, naphthenic acid, cyclohexyl propionic acid, naphthylacetic acid, and the like. For each mole of aminoimidazoline product, one mole of carboxylic acid having at least 9 carbon atoms and not over 33 carbon atoms must be employed in order to obtain a product containing a hydrocarbon group of from 8 to 32 carbon atoms substituted in the 2-position of one of the imidazoline rings.

Other acids suitable for use in imidazoline synthesis include many which contain oxygen other than that occurring as a portion of the carboxyl group. Examples of these are butylphenoxyacetic acid, ricinoleic acid, hydroxystearic acid, dihydroxystearic acid, hydroxy acids obtained by the oxidation of paraffin and high melting point microcrystalline waxes, aryl stearic acids such as are obtainable by condensation of phenol or alkylated phenol with oleic acid, and the like. When such acids as these are employed in imidazoline synthesis, the substituent of the 2-carbon atom of the imidazoline ring will contain the ether or hydroxyl group oxygen present in the original acid. In general, the amount of such oxygen, in comparison with the total weight of the group, is small and its presence will have relatively little, if any, effect on the general properties of the resulting imidazoline, and for all practical purposes, such acids can be used in the same way in which one would employ other carboxylic acids in preparing products employed in this invention. In the appended claims when reference is made to a hydrocarbon substituent in the 2-position of an imidazoline ring, we intend to include the residue of such hydroxy acids and ether acids, and when reference is made to the residue of a fatty acid as a substituent of the 2-position of the imidazoline ring, we intend to include the residues of such acids as ricinoleic acid and hydroxy stearic acid. These are recognized as being the obvious functional equivalents of the other fatty acids which do not contain such a hydroxyl group for the herein stated purposes.

One may also employ esters of the above mentioned carboxylic acids in imidazoline synthesis, as has been pointed out in the literature cited. For example, one might employ ethyl stearate in place of the stearic acid shown in the example above. In such instance, one mole of water and one mole of ethanol are evolved during the reaction. Where the ester of a high boiling or non-volatile alcohol is used, the alcohol formed during the reaction will main in the product. Usually, the amount of such alcohol constitutes a relatively small proportion of the product and may be left therein without seriously affecting its properties, as regards its utility in the present invention.

The condensation of carboxylic acids with polyamines to form aminoimidazolines, is usually carried out at a temperature of about 250° C. to 290° C. at atmospheric pressure. By carrying out the process under a partial vacuum, reaction may be completed at somewhat lower temperatures. Completeness of reaction may be determined by measurement of the amount of water evolved during reaction. Usually, a small amount of ammonia or other low boiling bases is evolved during the reaction, as the result of a minor amount of decomposition of the polyamine, particularly when the reaction is carried out at temperatures of 275-290° C. Allowance for the weight of such volatile material must be made in estimating the quantity of evolved water in the condensate from the reaction.

As pointed out previously, in Formula 1, the ring carbon atoms of the imidazoline, and the amino groups forming a part of the 1-substitutent, may have alkyl group substituents. The nature and location of these groups is determined by the choice of reactant polyamine.

For example, if one reacts stearic acid and 2-triethylene-tetramino-1-amino-propane, a substantial portion of the product results from the following reaction:

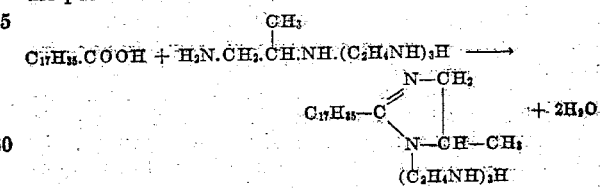

It is seen that the 5-carbon atom of the imidazoline ring has a methyl group substituent. If one employs 1-triethylene-tetramino-1-amino-butane as the polyamine reactant, the 5-carbon atom of the ring has an ethyl group substituent. Similarly, the 4-carbon atom of the ring may have an alkyl substituent, where the polyamine reactant contains an alkyl substituent on the carbon atom attached to a primary amino group.

In the above example of reaction between stearic acid and 2-triethylene-tetramino-1-amino-propane, the polyamine reactant contains two primary amino groups separated by two carbon atoms from a secondary amino group. Thus, the reaction between these compounds may proceed to formation of a polyamino imidazoline by two routes, the first illustrated above, and the second proceeding as follows:

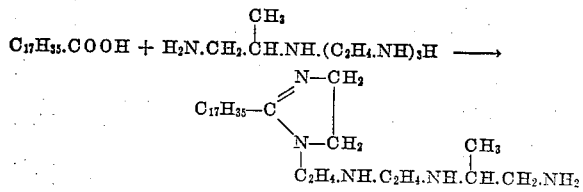

In which case the ring carbon atoms of the product have only hydrogen atom substituents.

In the preparation of various alkylene polyamines suitable for the synthesis of the reagents of the present invention, polyamines containing tertiary amino groups, or a multiplicity of secondary amino groups, and only one primary amino group may be obtained. With such reactants, products containing alkyl substituents on the amino groups may be obtained. For example:

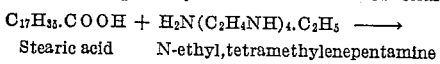
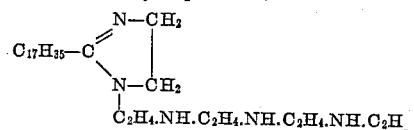

From the above description of the reactants used and the method of preparation employed, it is evident that the most general formula for the broad class of polyaminoimidazolines employed in the present invention is that of Formula 1, namely:

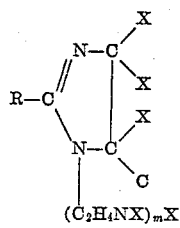

where R is a hydrocarbon radical containing from 8 to 32 carbon atoms and X is hydrogen or an alkyl radical, generally containing less than 4 carbon atoms, and $m$ is the numeral 3 to 10.

We have found that the polyaminoimidazolines having 3 or more amino groups in the substituent of the 1-nitrogen atom of the imidazoline radical, are particularly effective anti-stripping agents, showing activity considerably greater in this respect, than could be predicted from the behavior of imidazolines having 2 or fewer amino groups in the 1-nitrogen substituent. We prefer, particularly, the polyimidazolines containing from 4 to 10 amino groups.

Polyaminoimidazolines, which we particularly prefer to use, because of their unusual activity as anti-stripping agents and the availability of raw materials for their preparation, are those corresponding to the formula:

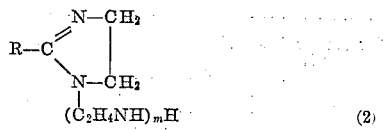

where the symbols R and $m$ have their previous meaning. It is to be noted that these products correspond to those of Formula 1, where X is hydrogen. These compounds are readily prepared from unsubstituted polyethylenepolyamines having 5 or more nitrogen atoms per molecule.

Further compounds of special interest are those of Formula 2, wherein R is the hydrocarbon residue of a fatty or resin acid and contains at least 8 and not over 20 carbon atoms. Such compounds represent particularly cheap and effective anti-stripping agents, and can be synthesized from acids such as oleic acid, stearic acid, rosin, abietic acid and tall oil acids.

As examples of suitable and particularly effective anti-stripping agents, the following are presented:

EXAMPLE 1

326 gms. of commercial tall oil (saponification value of 172 mg. KOH/gm.) was mixed with 232 gms. of crude high boiling polyethylene polyamine which assayed 36.0% nitrogen. This would correspond closely in nitrogen content to an average molecular composition of $NH_2(C_2H_4NH)_5H$. This mixture was placed in a 3-neck, round bottom flask, fitted with sealed stirrer, thermometer, water trap and condenser. While stirring, the reactants were slowly brought to 280° C., and held for 3 hours. During this period, 1.8 moles of water were collected in the trap, along with about 6 ml. of an oily liquid.

EXAMPLE 2

326 gms. of tall oil was reacted, as in Example 1, with 218 gms. of a polyethylenepolyamine assaying 32.6% nitrogen and consisting largely of monoethyl tetraethylenepentamine.

EXAMPLE 3

242 gms. of Oronite Chemical Company Naphthenic Acid "L" (one mole) was reacted as in Example 1, with 189 gms. of tetraethylenepentamine.

EXAMPLE 4

284 gms. of stearic acid were reacted with the polyamine of Example 2, employing the procedure and equipment of Example 1.

EXAMPLE 5

284 gms. of stearic acid and 189 gms. of tetraethylenepentamine were reacted as in Example 1.

EXAMPLE 6

326 gms. of tall oil and 189 gms. of tetraethylenepentamine were reacted as in Example 1.

EXAMPLE 7

302 gms. of abietic acid were reacted, as in Example 1, with 490 gms. of polyethyleneamine still residue which contained 30.6% nitrogen, and thus corresponded in nitrogen content to the amine, $H.(NH.C_2H_4)_{11}.NH_2$.

EXAMPLE 8

320 gms. of tall oil acids were reacted, as in Example 2, with 160 gms. of Carbide & Carbon Company Polyamine H, a polyethylene polyamine still residue assaying 31.9% nitrogen and boiling above tetraethylene pentamine.

Although we have described the present anti-stripping agents of polyaminoimidazolines, we may, in many instances, employ these compounds in the form of their salts, either with organic or inorganic acids. Being relatively strong polyacidic bases, they readily form a variety of salts, depending upon the extent of neutralization. Examples of acids which may be used to form such salts are hydrochloric, sulfuric, sulfamic, acetic, oxalic, oleic, stearic, tall oil, rosin, abietic, maleic, naphthenic, glycollic, phenylacetic, benzoic, etc.

Salts of the polyaminoimidazolines are effective anti-stripping agents as well, and in some instances, exhibit better solubility in cut-back asphalt, or solvents in which they are to be applied to rock or other aggregate.

The products of the present invention are generally effective in preventing the stripping of asphalt when incorporated therein in concentrations within the range of about 0.05% to 2%. The amount required depends, in any particular case, upon the nature of the asphalt, the temperature of cure, the kind of surface coated, and perhaps other variables not completely known. In actual practice, the required amount of reagent to prevent stripping is often estimated by laboratory tests with the asphaltic composition and the aggregate of immediate interest.

The effectiveness of the present reagents in preventing stripping is illustrated by the results of laboratory stripping tests such as are shown in Table I below. This test was conducted as follows:

100 grams of State of Virginia siliceous test aggregate was placed in a one-pint wide-mouth jar. Two grams of water were added to the aggregate, the jar was closed and the contents mixed by rotating the jar on a roller mill for 2 minutes. To the thoroughly wetted aggregate was then added 4 grams of RC-3 cut-back Mid-continent asphalt containing a known amount of the anti-strip additive. This mixture was rolled on the mill for 30 minutes, after which 250 ml. of distilled water were added to the jar. The contents were then mixed for one hour on the mill. The jars were then righted and allowed to stand 30 minutes, following which the water and any floating asphalt were decanted from the jar. The aggregate was then dropped onto clean filter paper, allowed to drain and dry at room temperature, and finally inspected for percentage of surface stripped.

For comparison, the results are also given for a number of imidazolines, and for aminoimidazolines having only one or two amino groups in the 1- nitrogen substituent.

These conditions simulate the worst type of conditions to be encountered in road building, i. e., those requiring coating of a wet aggregate with a heavy rain falling on the freshly laid road surface. Under these conditions of test, stripping of less than about 20% is considered as indicating an effective reagent and concentration.

*Table I*

| Reagent Added | Percentage of Asphalt Stripped | | |
|---|---|---|---|
| | Percent (by weight) of reagent in RC-3 Asphalt | | |
| | 0.1% | 0.25% | 0.50% |
| Product of Example 8 | 40 | 5 | None |
| Product of Example 5 | 40 | 3 | 1 |
| 2-heptadecylimdazoline | 100 | 95 | 10 |
| Product of Example 2 | 40 | 25 | 5 |
| Product of Example 6 | 60 | 40 | 5 |
| Product from Tall Oil and Triethylenetetramine | 90 | 50 | 25 |
| Product from Tall Oil and Diethylenetramine | 95 | 60 | 10 |

The particular effectiveness of the products described herein is to be noted, particularly at low and intermediate concentrations.

While, in the experiment described above, the anti-stripping agent was added to the asphalt solution, other methods of application are equally effective. The reagent may be dissolved in water or other solvent and applied to the aggregate before contacting with the asphalt. Where it is desired to use an aqueous solution it is frequently advisable to employ the reagent as a salt, for example, as the acetate, chloride, or sulfate, in which form it is more likely to be easily water-soluble or dispersible. When used in oil solution, salts may be used also, as, for example, the acetate, oleate, sulfate, or stearate.

Alternatively, the undiluted reagent may be applied to the rock or other surface by spraying, dipping or milling, preferably while hot and thus low in viscosity.

When employed in emulsified asphalts, the reagent may be added directly to the emulsion, or may be incorporated in the asphalt or water prior to emulsification.

We have found that certain salts of the polyaminoimidazolines are superior in anti-stripping properties to the unneutralized polyaminoimidazoline. These salts are the complete or partial salts prepared by the addition of monocarboxy, detergent-forming acids, containing from 8 to 32 carbon atoms, or polymerized, detergent-forming, carboxy acids containing from 8 to 32 carbon atoms per carboxyl group. Examples of suitable monocarboxy, detergent-forming acids are octoic acid, oleic acid, palmitic acid, stearic acid, linoleic acid, erucic acid, tall oil fatty acids, abietic acid, ricinoleic acid, rosin, naphthenic acid, oxidized wax acids, phenylstearic acid, and the like.

Examples of polymerized, detergent-forming acids suitable for neutralization or partial neutralization of the present aminoimidazolines to improve their anti-stripping action, are the dimeric and trimeric linoleic acids, such as are described by Goebel, Journal of American Oil Chemists Society, 24, 65 (1947), the corresponding acids from oleic acid and linolenic acid, polymerized rosin, polymerized abietic acid, and the like. For the preparation of polymerized rosin or abietic acid, see e. g., U. S. Patent No. 2,515,218, dated July 18, 1950, to Hampton.

Since the aminoimidazolines of the present invention contain three or more amino groups, besides the imidazoline ring group, they will require, in general, more than one equivalent of acid for complete neutralization. We have found that a great improvement in anti-strip action is obtained by the addition of a minimum of one equivalent of acid per mole of imidazoline, and that some further improvement is usually obtained by neutralizing with two equivalents of acid per mole. Higher degrees of neutralization, up to one equivalent of acid for each amino group and the imidazoline ring, may be employed, but will not show much greater anti-strip activity than that observed with the salts made with one or two equivalents of acid per mole.

The value of the aminoimidazoline salts as anti-strip agents is particularly apparent with carbonate aggregate rock consisting of limestone or dolomite or made up of mixtures of siliceous and limestone or dolomitic rock. While the aminoimidazolines, per se, are outstandingly effective on siliceous aggregate, their wetting action on carbonate rocks is poor. The salts described above, however, we find to be very effective anti-strip agents for siliceous, limestone and dolomite aggregate. To illustrate this unexpected and unusual effectiveness of these salts as anti-strip agents, the data of Table II are presented. These data were obtained from laboratory stripping tests run as those described above in connection with Table I, except that limestone aggregate was employed. A mid-continent MC-3 asphalt was used. For comparison, some results are shown for unneutralized aminoimidazoline.

*Table II*

| Salt Added to MC-3 Asphalt by Combining— | | | Percentage of Asphalt Stripped | | |
|---|---|---|---|---|---|
| Aminoimidazoline | Acid | Gms. of Acid per 100 gms. Aminoimidazoline | Wt. percent of Salt in MC-3 Asphalt (expressed as Aminoimidazoline) | | |
| | | | 0.2 | 0.3 | 0.4 |
| Product of Example 8 | None | | 100 | 100 | 95 |
| Do | Oleic | 58 | 40 | 35 | 30 |
| Do | do | 116 | 50 | 20 | 15 |
| Do | Tall Oil | 77 | 80 | 50 | 15 |
| Do | do | 132 | 25 | 40 | 5 |
| Do | Dimeric Linoleic | 63 | 50 | 20 | 6 |
| Do | do | 126 | 5 | 3 | Less than 1. |

These results clearly show the greatly improved effectiveness of the aminoimidazoline salt on limestone aggregate.

In addition to these tests, similar ones were run with these salts on Virginia silica and Meramec River (Missouri) gravel, two siliceous rocks. In all cases the salts were as effective as the unneutralized aminoimidazoline when compared on the basis of aminoimidazoline concentrate in the asphalt.

The discovery of the effectiveness of these organic acid salts on carbonate aggregates actually constitutes an invention within an invention, and becomes of great practicable importance in the treatment of asphalts which are to be applied to aggregates containing significant amounts of carbonate rocks, such as limestone, dolomite, dolomitic limestone, and the like. Since, in practical work, stripping of as much as 5% of the surface becomes important, the presence of as much as 5%, or possibly, even less, of carbonate rock in an aggregate constitutes a significant proportion. Reference in the claims to aggregate containing a significant amount of carbonate rock is intended to include aggregates containing 5% or more of such material.

While reference has been made particularly to the treatment of asphalt, it should be understood that the present process is applicable to and is intended to include treatment of equivalent bituminous materials, both natural and artificial, such as natural asphalt, blown asphalt, and similar products, and solutions, emulsions and dispersions of these products.

Having thus described our invention, what we claim as new and desire to secure by Letters Patent is:

1. An improved bituminous composition including a bituminous bonding agent, a solid aggregate containing a significant proportion of carbonate rock, and 0.05% to 2%, based on bituminous agent, of a salt of a polyaminoimidazoline of the formula:

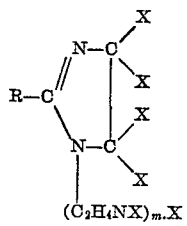

(C₂H₄NX)ₘ.X where R is a hydrocarbon radical containing from 8 to 32 carbon atoms, m is the numeral 3 to 10, and X is selected from the class consisting of hydrogen and alkyl groups containing less than 4 carbon atoms; the acid group of said salt being selected from the class consisting of monocarboxy, detergent-forming acids, containing from 8 to 32 carbon atoms, and polymerized detergent-forming carboxy acids containing from 8 to 32 carbon atoms per carboxyl group; with the proviso that said salt contain at least one equivalent of carboxylic acid per mole of polyaminoimidazoline.

2. An improved bituminous composition including a bituminous bonding agent, a solid aggregate containing significant proportions of carbonate rock, and 0.05% to 2%, based on bituminous agent, of a salt of a polyaminoimidazoline of the formula:

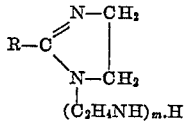

(C₂H₄NH)ₘ.H where R is a hydrocarbon radical containing from 8 to 32 carbon atoms and m is the numeral 3 to 10; the acid group of said salt being selected from the class consisting of monocarboxy, detergent-forming acids, containing from 8 to 32 carbon atoms, and polymerized detergent-forming carboxy acids containing from 8 to 32 carbon atoms per carboxyl group; with the proviso that said salt contain at least one equivalent of carboxylic acid per mole of polyaminoimidazoline.

3. An improved bituminous composition including a bituminous bonding agent, a solid aggregate containing a significant proportion of carbonate rock, and 0.05% to 2%, based on bituminous agent, of a salt of a polyaminoimidazoline of the formula:

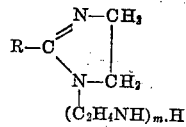

(C₂H₄NH)ₘ.H where R is the hydrocarbon radical of an acid selected from the class consisting of fatty acid and resin acids, and contains from 8 to 20 carbon atoms; and m is the numeral 3 to 10; the acid group of said salt being selected from the class consisting of monocarboxy, detergent-forming acids, containing from 8 to 32 carbon atoms, and polymerized detergent-forming carboxy acids containing from 8 to 32 carbon atoms per carboxyl group; with the proviso that said salt contain at least one equivalent of carboxylic acid per mole of polyaminoimidazoline.

4. An improved bituminous composition including a bituminous bonding agent, a solid aggregate containing a significant proportion of carbonate rock, and 0.05% to 2%, based on bituminous agent, of a salt of a polyaminoimidazoline of the formula:

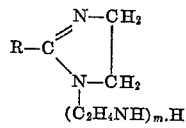

(C₂H₄NH)ₘ.H where R is the hydrocarbon radical of tall oil acids, and m is the numeral 3 to 10; the acid group of said salt being selected from the class consisting of monocarboxy, detergent-forming acids, containing from 8 to 32 carbon atoms, and polymerized detergent-forming carboxy acids containing from 8 to 32 carbon atoms per carboxyl group; with the proviso that said salt contain at least one equivalent of carboxylic acid per mole of polyaminoimidazoline.

5. An improved bituminous composition including a bituminous bonding agent, a solid aggregate containing a significant proportion of carbonate rock, and 0.05% to 2%, based on bituminous agent, of a salt of a polyaminoimidazoline of the formula:

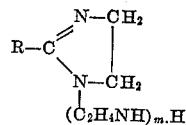

(C₂H₄NH)ₘ.H where R is the hydrocarbon radical of rosin acids, and m is the numeral 3 to 10; the acid group of said salt being selected from the class consisting of monocarboxy, detergent-forming acids, containing from 8 to 32 carbon atoms, and polymerized detergent-forming carboxy acids containing from 8 to 32 carbon atoms per carboxyl group; with the proviso that said salt contain at least one equivalent of carboxylic acid per mole of polyaminoimidazoline.

6. An improved bituminous composition including a bituminous bonding agent, a solid aggregate containing a significant proportion of carbonate rock, and 0.05% to 2%, based on bituminous agent, of a salt of a polyaminoimidazoline of the formula:

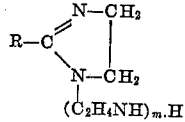

(C₂H₄NH)ₘ.H where R is the hydrocarbon radical of stearic acid, and m is the numeral 3 to 10; the acid group of said salt being selected from the class consisting of monocarboxy, detergent-forming acids, containing from 8 to 32 carbon atoms, and polymerized detergent-forming carboxy acids containing from 8 to 32 carbon atoms per carboxyl group; with the proviso that said salt contain at least one equivalent of carboxylic acid per mole of polyaminoimidazoline.

7. An improved bituminous composition including a bituminous bonding agent, a solid aggregate containing a significant proportion of carbonate rock, and 0.05% to 2%, based on bituminous agent, of a salt of a polyaminoimidazoline of the formula:

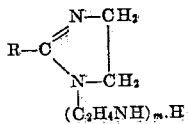

where R is the hydrocarbon radical of oleic acid, and $m$ is the numeral 3 to 10; the acid group of said salt being selected from the class consisting of monocarboxy, detergent-forming acids, containing from 8 to 32 carbon atoms, and polymerized detergent-forming carboxy acids containing from 8 to 32 carbon atoms per carboxyl group; with the proviso that said salt contain at least one equivalent of carboxylic acid per mole of polyaminoimidazoline.

8. An improved bituminous composition including a bituminous bonding agent, a solid aggregate containing a significant proportion of carbonate rock, and 0.05% to 2%, based on bituminous agent, of a salt of a polyaminoimidazoline of the formula:

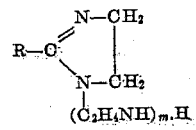

where R is the hydrocarbon radical of lauric acid, and $m$ is the numeral 3 to 10; the acid group of said salt being selected from the class consisting of monocarboxy, detergent-forming acids, containing from 8 to 32 carbon atoms, and polymerized detergent-forming carboxy acids containing from 8 to 32 carbon atoms per carboxyl group; with the proviso that said salt contain at least one equivalent of carboxylic acid per mole of polyaminoimidazoline.

References Cited in the file of this patent
UNITED STATES PATENTS

| | | |
|---|---|---|
| 2,361,488 | Mikeska | Oct. 31, 1944 |
| 2,436,599 | Read et al. | Feb. 24, 1948 |
| 2,468,163 | Blair et al. | Apr. 26, 1949 |